(12) United States Patent
Ozog et al.

(10) Patent No.: US 9,975,490 B1
(45) Date of Patent: May 22, 2018

(54) SIDE STEP APPARATUS AND ACTUATION MECHANISM

(71) Applicant: AISIN TECHNICAL CENTER OF AMERICA, INC., Northville, MI (US)

(72) Inventors: Nicholas Ozog, South Lyon, MI (US); Brad Baskin, Ann Arbor, MI (US); Aaron Welter, Northville, MI (US); Eric Archambeau, South Lyon, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days. days.

(21) Appl. No.: 15/431,222

(22) Filed: Feb. 13, 2017

(51) Int. Cl.
*B60R 3/02* (2006.01)
*B62D 35/00* (2006.01)

(52) U.S. Cl.
CPC .............. *B60R 3/02* (2013.01); *B62D 35/008* (2013.01); *B60Y 2400/405* (2013.01); *B60Y 2400/411* (2013.01)

(58) Field of Classification Search
CPC ... B60R 3/02; B62D 35/008; B60Y 2400/411; B60Y 2400/405
See application file for complete search history.

(56) References Cited

U.S. PATENT DOCUMENTS

| | | | | |
|---|---|---|---|---|
| 6,375,207 | B1* | 4/2002 | Dean | B60R 3/02 182/88 |
| 8,833,782 | B2* | 9/2014 | Huotari | B60R 3/02 280/163 |
| 9,272,667 | B2* | 3/2016 | Smith | B60R 3/02 |
| 9,481,396 | B2* | 11/2016 | Jachowski | B62D 25/025 |
| 2005/0258616 | A1* | 11/2005 | Scheuring, III | B60R 3/02 280/166 |
| 2007/0069497 | A1* | 3/2007 | Watson | B60R 3/02 280/166 |
| 2008/0054586 | A1* | 3/2008 | Lechkun | B60R 3/02 280/166 |
| 2009/0295115 | A1* | 12/2009 | Yang | B60R 3/02 280/166 |
| 2016/0244107 | A1* | 8/2016 | Ishiba | B62D 35/008 |
| 2016/0264057 | A1* | 9/2016 | Lee | B62D 35/008 |
| 2016/0264086 | A1* | 9/2016 | Benvenuto | B62D 35/008 |
| 2017/0137075 | A1* | 5/2017 | Povinelli | B62D 35/008 |

FOREIGN PATENT DOCUMENTS

WO 2015/143294 A1 9/2015

* cited by examiner

*Primary Examiner* — Brian L Swenson
(74) *Attorney, Agent, or Firm* — Oblon, McClelland, Maier & Neustadt, L.L.P.

(57) ABSTRACT

A side step apparatus for a vehicle including a side step, a bracket having a base plate and a panel plate, and an actuation mechanism including a first link, a second link and an actuator connected between the base plate of the bracket and the side step to move the side step in at least one of a running board position, an aerodynamic position, and a stowed position based on a speed of the vehicle.

7 Claims, 8 Drawing Sheets

SIDE STEP APPARATUS AND ACTUATION MECHANISM

BACKGROUND

Field of the Disclosure

This disclosure relates generally to improvements to a side step of a vehicle. More particularly the present disclosure relates to improvements relating to actuation of the side step in at least three positions.

Description of the Related Art

A running board or a side step is a common accessory of a vehicle such as a truck. Typically, the running board is installed on a side of the vehicle below a side door. The running board assists in entering and exiting the vehicle, wiping off dirt on a shoe before entering the vehicle, blocking debris and preventing damage to the side panels of the vehicle, aesthetics, etc. However, the running board can also increase drag on the vehicle, when the vehicle is moving.

In the U.S. Pat. No. 8,833,782B2, an independent running board actuation is described. The system uses a sensor system to identify when a vehicle door is opened. Upon detection of opening of the door, the running board actuates from beneath the vehicle to a usable position. However, the running board itself does not offer any aerodynamic benefit. The running board is hidden beneath the vehicle, so the running board does not add significant drag when the vehicle is moving. But, this renders the system relatively drag neutral, and does not aid in the reduction of drag forces on the vehicle.

In the Patent No. WO2015143294A1, an aerodynamic side skirt system for a truck is presented. The system uses components integrated with the vehicle's side panel assembly to improve the vehicle's aerodynamics. At a designated speed, the side skirt system actuates from a hidden position beneath the vehicle to an aerodynamic position. However, the reference includes additional panels integrated to the body of the vehicle, which can add unnecessary weight.

There remains a continuing need to provide improved running board (or side step) having lower mass and the same strength or even an improved (increased) strength and performance.

SUMMARY

According to an embodiment of the present disclosure, there is provided a side step apparatus. The side step apparatus for a vehicle includes a side step, a bracket having a base plate and a panel plate, and an actuation mechanism including a first link, a second link and an actuator connected between the base plate of the bracket and the side step to move the side step in at least one of a running board position, an aerodynamic position, and a stowed position based on a speed of the vehicle.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
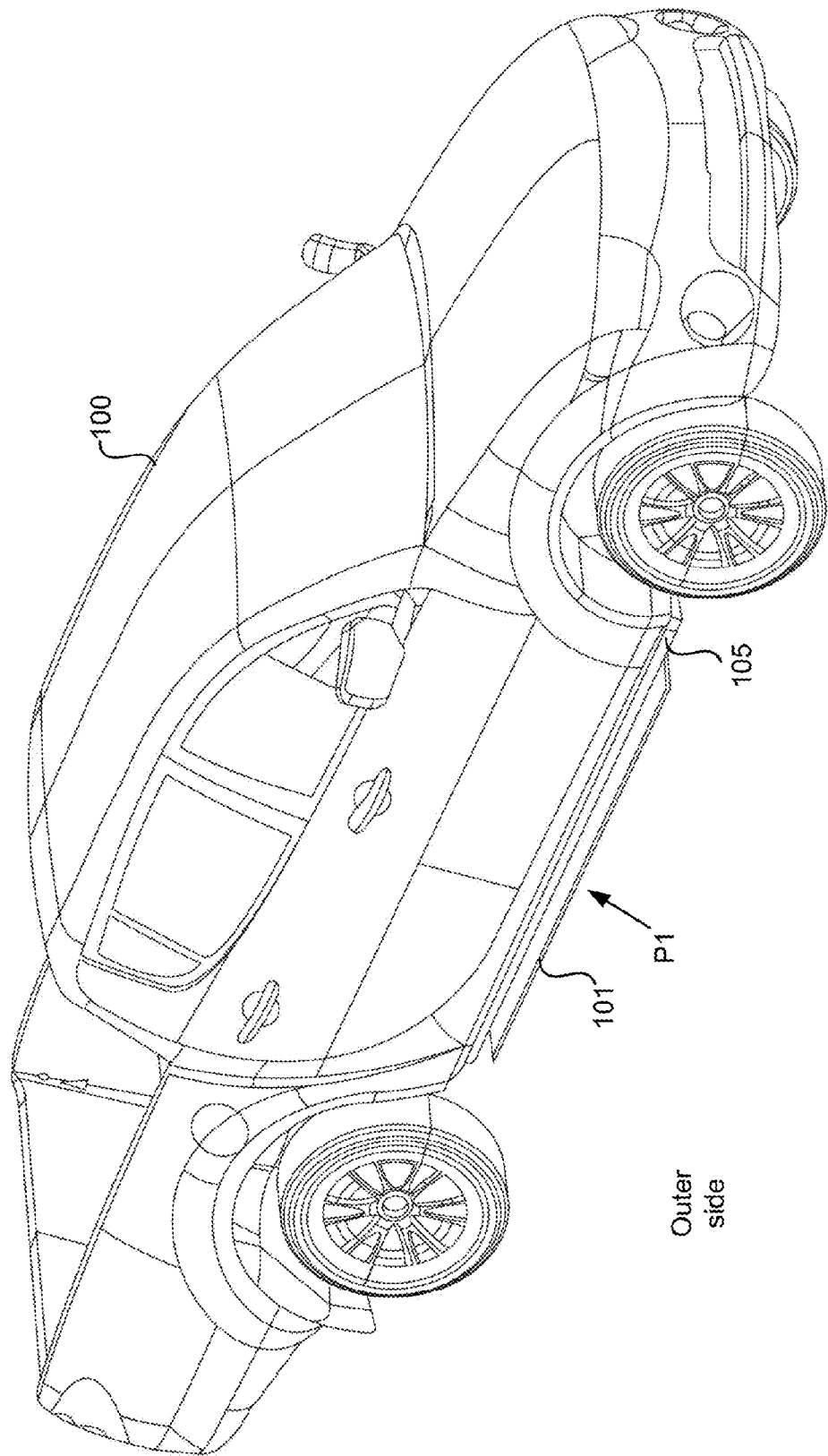
FIG. 1 is a perspective illustration of a side step of a vehicle in a running board position according to an exemplary embodiment of the present disclosure.

FIG. 1 is a perspective illustration of a side step 101 of a vehicle in a running board position according to an exemplary embodiment of the present disclosure. The side step 101 is an elongated board attached to the side of a vehicle below a side door to allow passengers to step on or off when entering or exiting the vehicle. The side step 101 can also function as an aerodynamic component to reduce drag on the vehicle 100. The side step 101 is movable between three positions—a running board position P1, an aerodynamic position P2 and a stowed position P3. The mechanism to achieve the three positions is discussed with respect to FIGS. 4A-4B, 5A-5B, 6A-6B, and 7A-7B.

The side step 101 is attached to a rocker panel 105 of the vehicle. The rocker panel 105 is attached along a lower side of the vehicle and connected to a vehicle frame. The rocker panel 105 enables connection of the side step 101 with the vehicle 100.

In the running board position P1, the side step 101 projects outwards (outer side) from the vehicle to allow passengers to step on or off when entering or exiting the vehicle. The running board position P1 is preferably occupied when the vehicle 100 is stationary.

Figure 2:
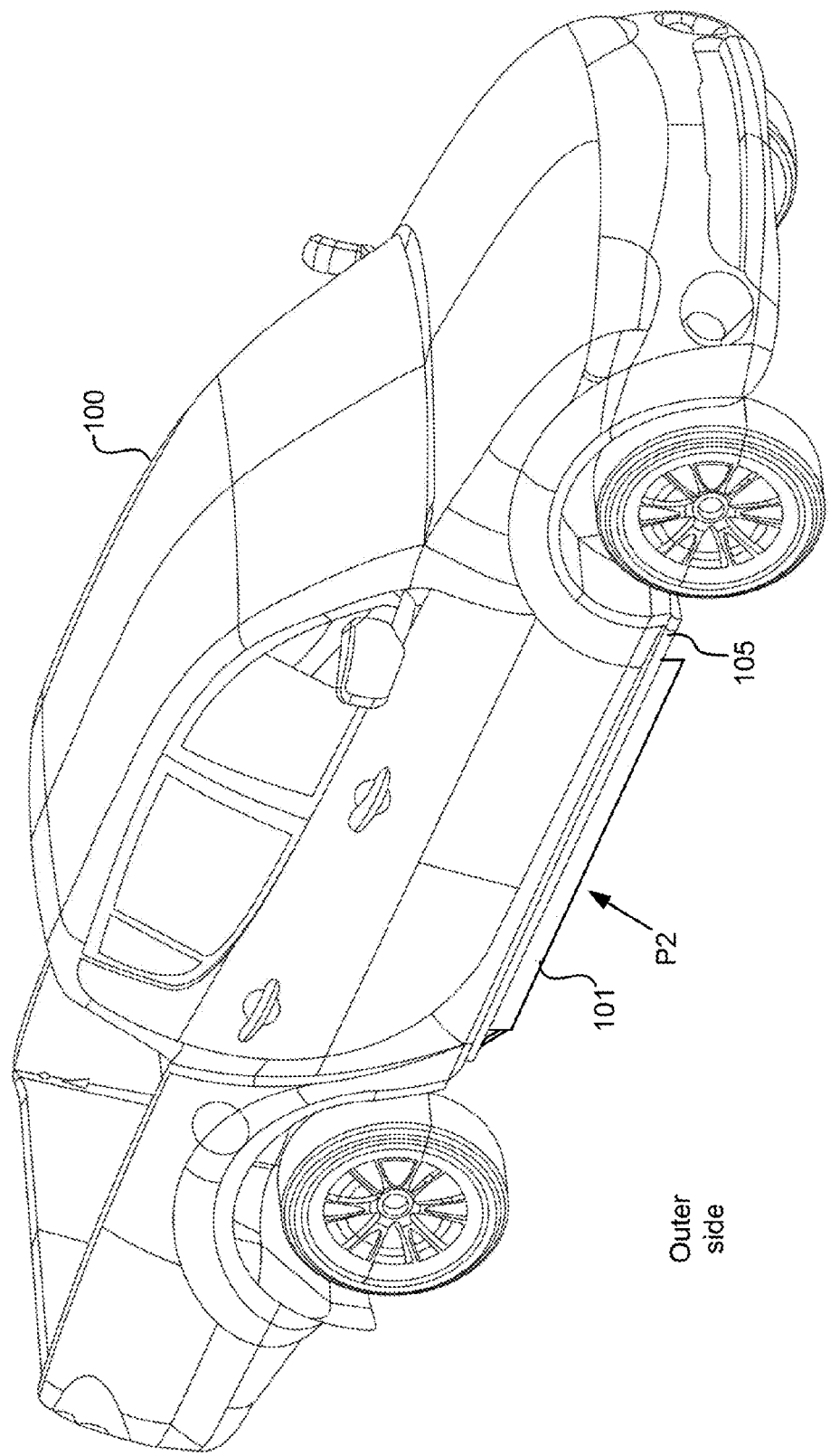
FIG. 2 is a perspective illustration of the side step of the vehicle in an aerodynamic position according to an exemplary embodiment of the present disclosure.

FIG. 2 is a perspective illustration of the side step 101 in the aerodynamic position P2 according to an exemplary embodiment of the present disclosure. In the aerodynamic position P2, the side step 101 extends below the underside of the vehicle 100 and is approximately perpendicular to the ground. In the aerodynamic position P2, the side step 101 can improve the air flow around the vehicle 100, through reduction in ground clearance. Furthermore, a reduction in aerodynamic drag can be achieved without adding significant weight to the vehicle 100. The aerodynamic position P2 is occupied when the vehicle is moving at a speed greater than 25 miles per hour (mph) or 40 kilometers per hour (kph).

Figure 3:
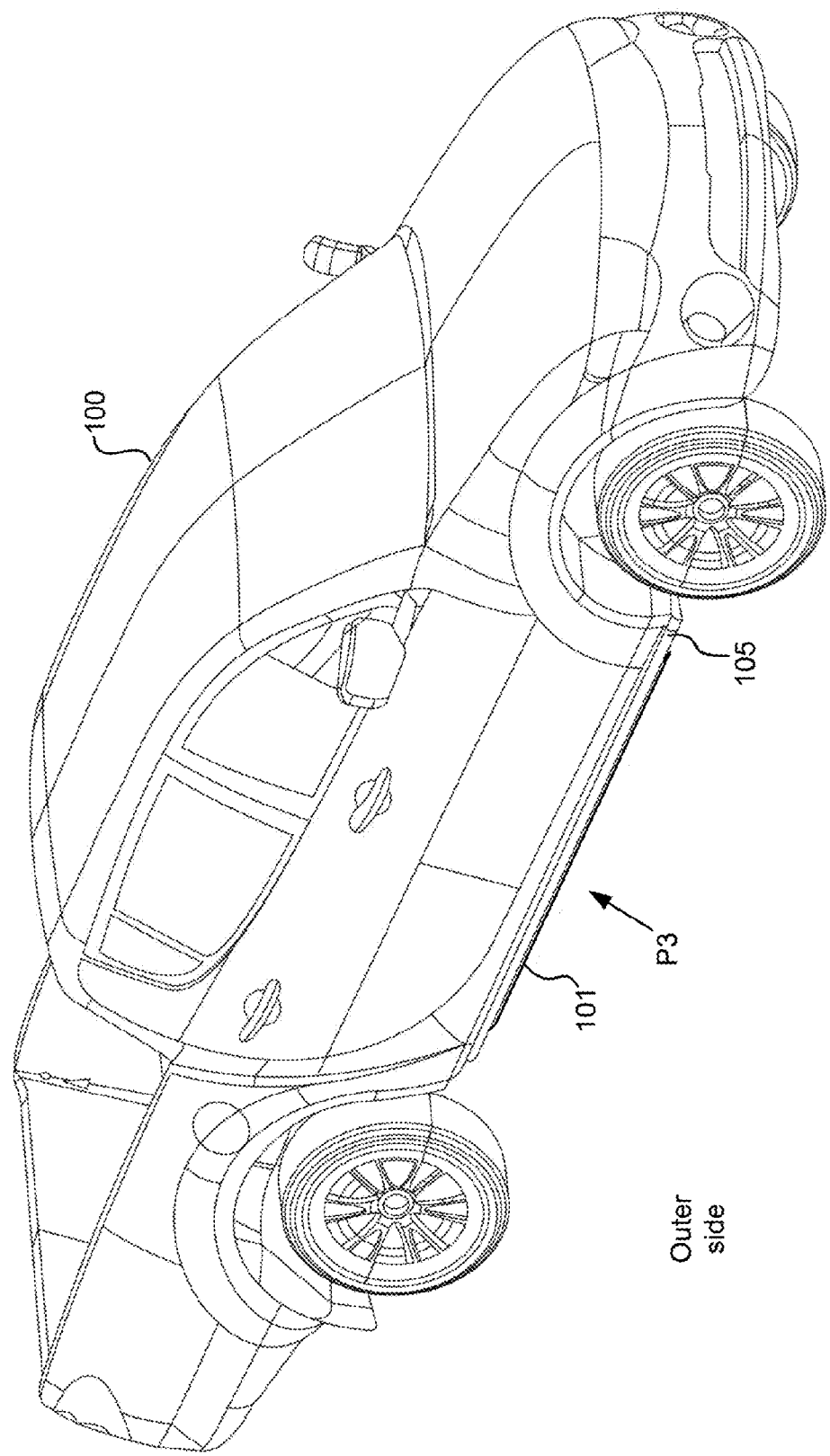
FIG. 3 is a perspective illustration of the side step of the vehicle in a stowed position according to an exemplary embodiment of the present disclosure.

FIG. 3 is a perspective illustration of the side step 101 in the stowed position P3 according to an exemplary embodiment of the present disclosure. In the stowed position P3, the side step 101 is retracted beneath the vehicle 100. In the stowed position P3, the side step 101 improves the aerodynamics of the vehicle 100 at low speed (e.g., up to 25 mph) while maintaining the ground clearance. The stowed position P3 can prevent damage to the side step 101, especially in a hilly terrain, bumpy roads, driving over a speed bump or an obstacle, etc.

Figure 4A:
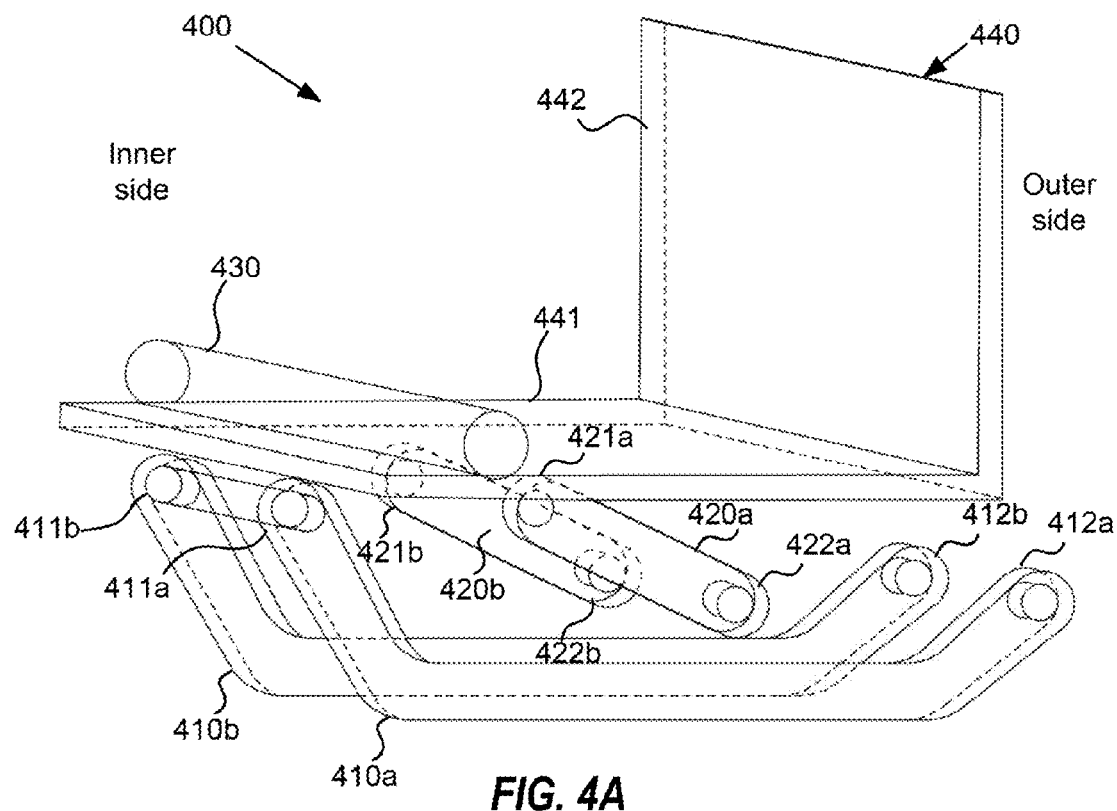
FIG. 4A is a perspective illustration of a linkage assembly according to an exemplary embodiment of the present disclosure.
Figure 4B:
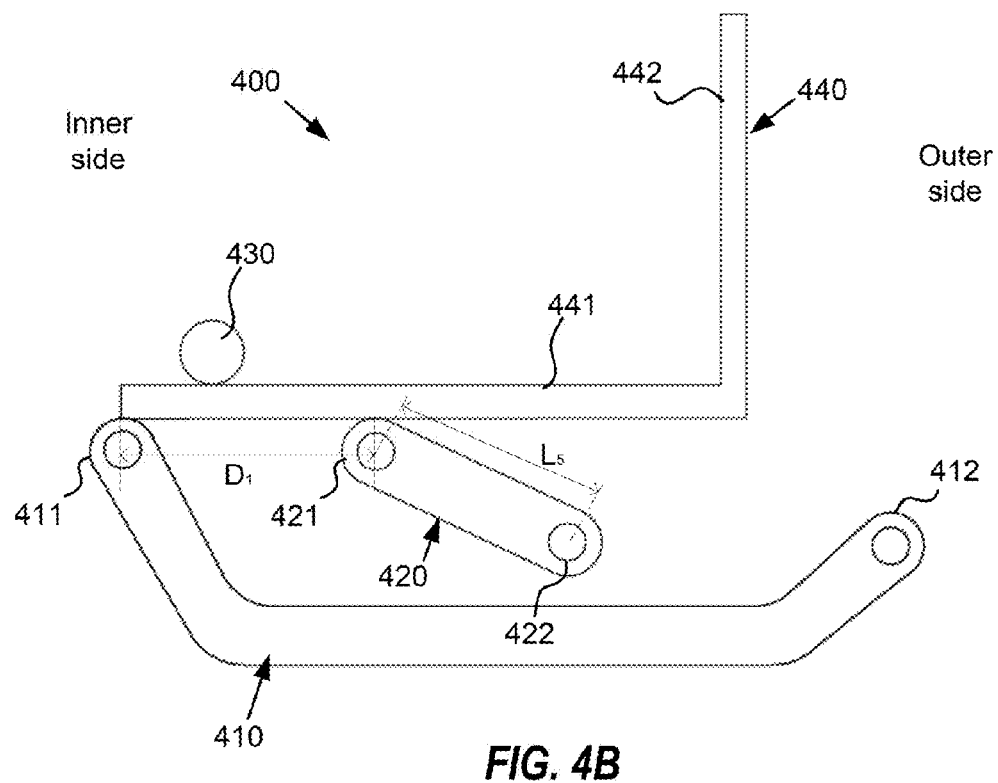
FIG. 4B is an elevation view of the linkage assembly according to an exemplary embodiment of the present disclosure.

FIGS. 4A and 4B illustrate a linkage assembly 400 according to an exemplary embodiment of the present disclosure. The linkage assembly 400 includes first links 410a and 410b (collectively referred as a first link 410), second links 420a and 420b (collectively referred as a second link 420) and an actuator 430. The distance $D_1$, in FIG. 4B, is a distance between the first link 410 and the second link 420.

Referring to FIG. 4B, the first link 410 has a first end 411 (i.e., 411a and 411b in FIG. 4A) and a second end 412 (i.e., 412a and 412b in FIG. 4A). Similarly, the second link 420 has a first end 421 (i.e., 421a and 421b in FIG. 4A) and a second end 422 (i.e., 422a and 422b in FIG. 4A). The first end 411 of the first link 410 and the first end 421 of the second link 420 can be hinged to a bracket 440. While, the second end 412 of the first link 410 and the second end 422 of the second link 420 can hinged the side step 101.

The bracket 440 has an approximately right angular shape formed of a base plate 441 and a panel plate 442. The linkage assembly 400 is attached to the base plate 441, while the panel plate 442 is attached to the rocker panel 105 via fasteners, welding or other fastening methods. The first end 411 of the first link 410 and the first end 421 of the second link 420 can be hinged to the underside of the base plate 441. On the top side of the base plate 441, the actuator 430 can be attached.

The actuator 430 is operably connected to the side step 101 to move the side step 101 between the three positions P1, P2, and P3. The actuator 430 can rotate the first link 410 about a first end 411 of the first link 410. Alternatively or in addition, the actuator 430 can rotate the second link 420 about the first end 421 of the second link 420. The actuator 430 can be a linear actuator, an electric motor, or other actuation methods. The actuator 130 can be driven electrically or hydraulically. The actuator 430 can be controlled by a controller. The actuation can occur under pre-defined conditions such as vehicle reaching a speed threshold, failure to meet a speed threshold, and manual override.

The controller can determined the position of the side step 101 based on the speed of the vehicle 100. The speed of the vehicle can be measured using a speed sensor commonly installed in the vehicle 100. Based on the determined position, the controller can send a signal to the actuator 430 to rotate the first link 410 until the desired position is attained.

Figure 4C:
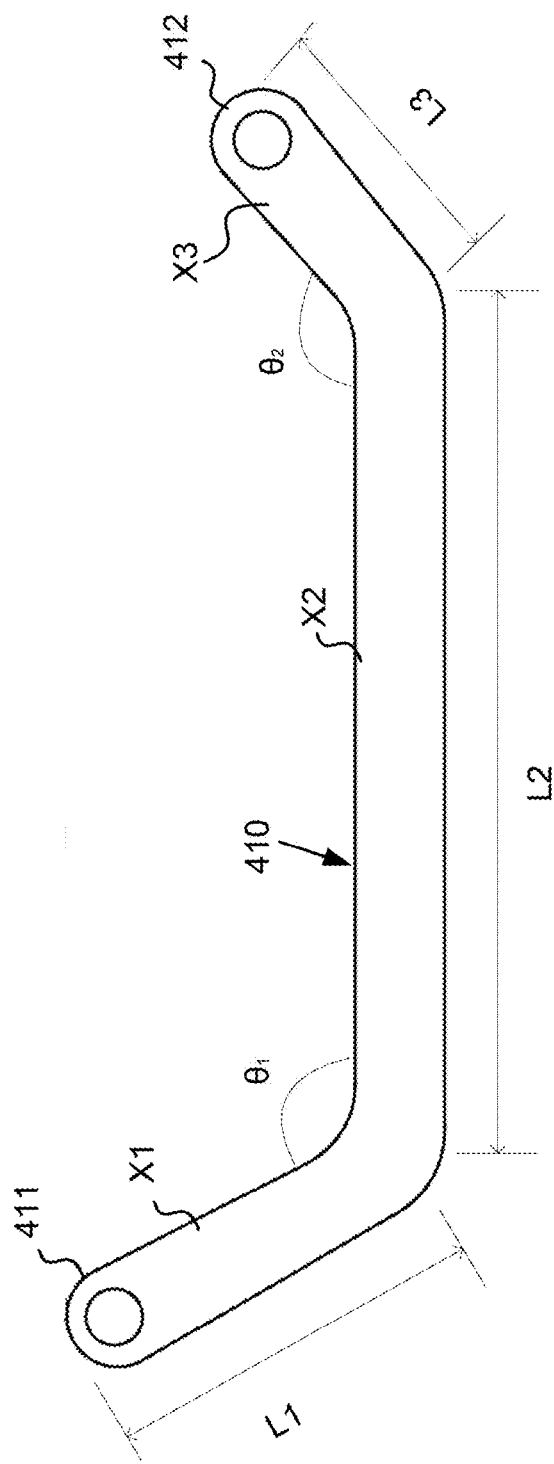
FIG. 4C illustrates a first link of the linkage assembly according to an exemplary embodiment of the present disclosure.

FIG. 4C illustrates the first link 410 of the linkage assembly 400 according to an exemplary embodiment of the present disclosure. The first link 410 can be divided into three portions—a first portion X1, a second portion X2, and a third portion X3. The first portion X1 can have a length of $L_1$ and inclined at a first angle $\theta_1$ with respect to the second portion X2. The second portion can be substantially straight (or horizontal) and have a length $L_2$. The third portion X3 can have a length of $L_3$ and inclined at a second angle $\theta_2$ with respect to the second portion X2. The first angle $\theta_1$ and the second angle $\theta_2$ can be greater than 90°. Referring back to FIG. 4B, the second link 420 can be of a length $L_5$.

Figure 5A:
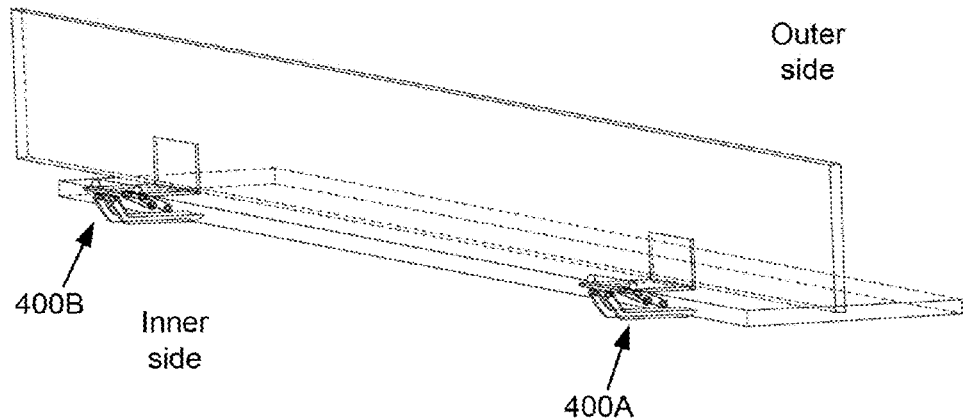
FIGS. 5A-5B illustrate the linkage assembly in the running board position according to an exemplary embodiment of the present disclosure.
Figure 5B:
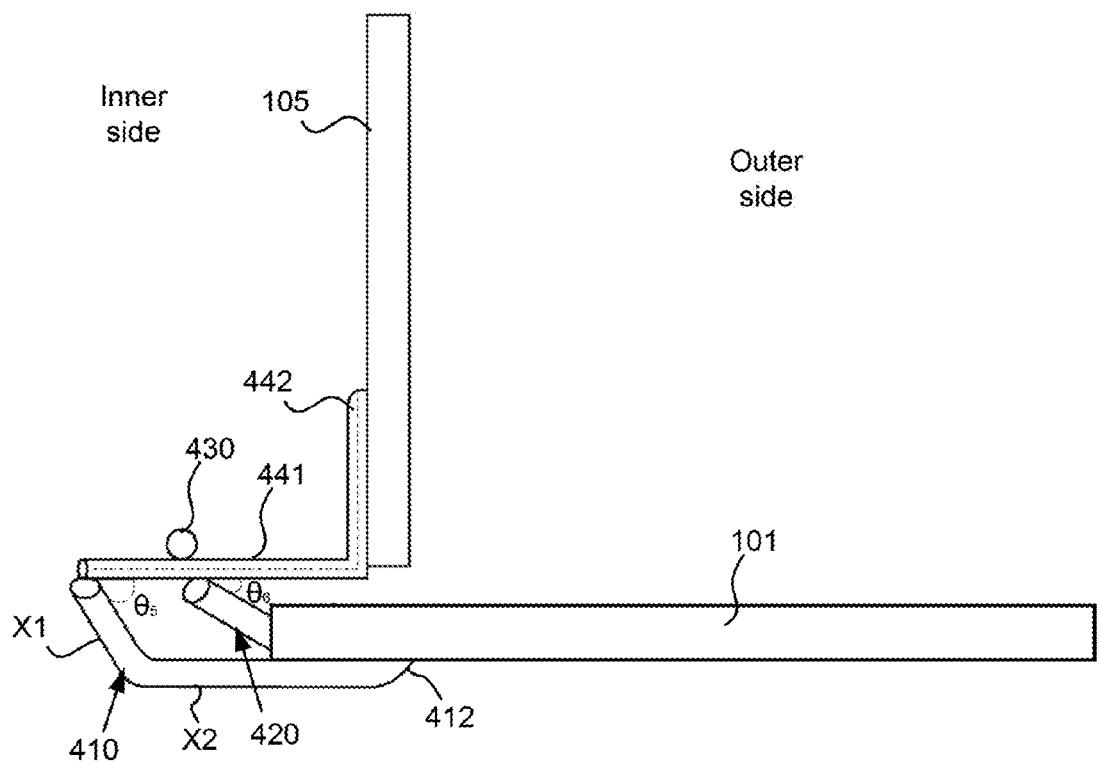

FIGS. 5A-5B illustrate the linkage assembly 400 in the running board position P1 according to an exemplary embodiment of the present disclosure. FIG. 5A illustrates that the side step 101 can be attached to two linkage assemblies 400A and 400B. The linkage assemblies 400A and 400B are located on an inner side of the rocker panel 105, while the side step 101 projects towards the outer side of the rocker panel 105.

Referring to FIG. 5B, the side step 101 is connected to the second end 412 of the first link 410 on the underside of the side step 101, while the second end 422 (now shown) of the second link 410 is connected to a left edge of the side step 101. In the running board position P1, the linkage assembly 400 is maintained in a first state. In the first state, the second portion X2 of first link 410 is horizontal, the first portion X1 of the first link 410 is inclined at an angle $\theta_5$ and the second link 420 is at an angle $\theta_6$ with the base plate 441 of the bracket 440. According to the present disclosure, the angles $\theta_5$ and $\theta_6$ are less than 90° in the first state of the linkage assembly 400.

Figure 6A:
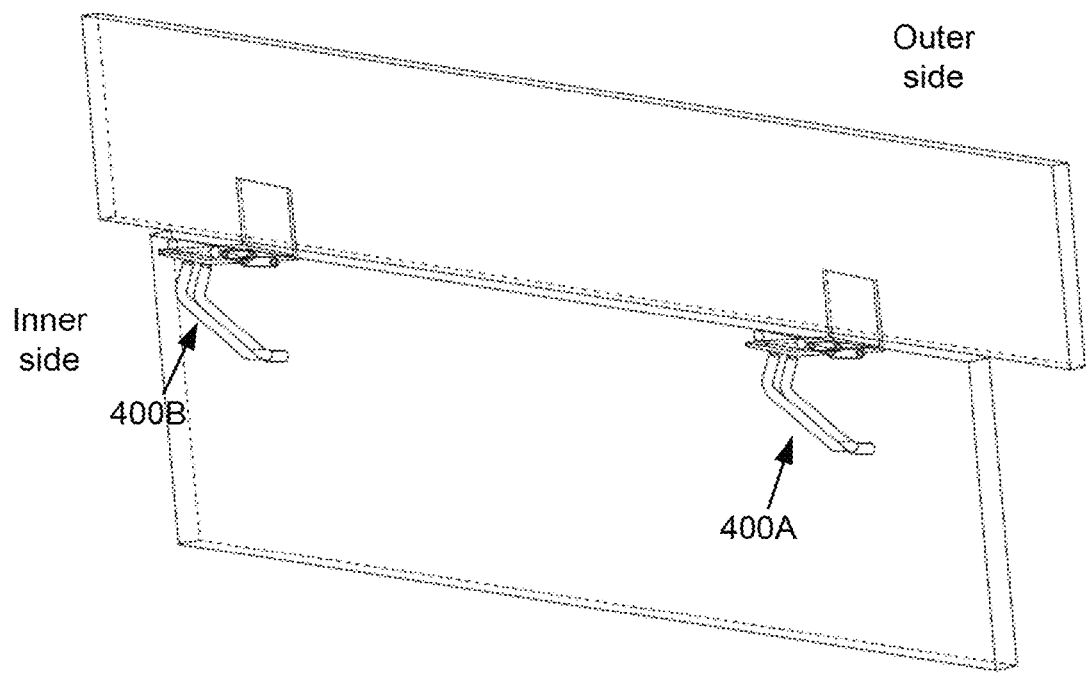
FIGS. 6A-6B illustrate the linkage assembly in the aerodynamic position according to an exemplary embodiment of the present disclosure.
Figure 6B:
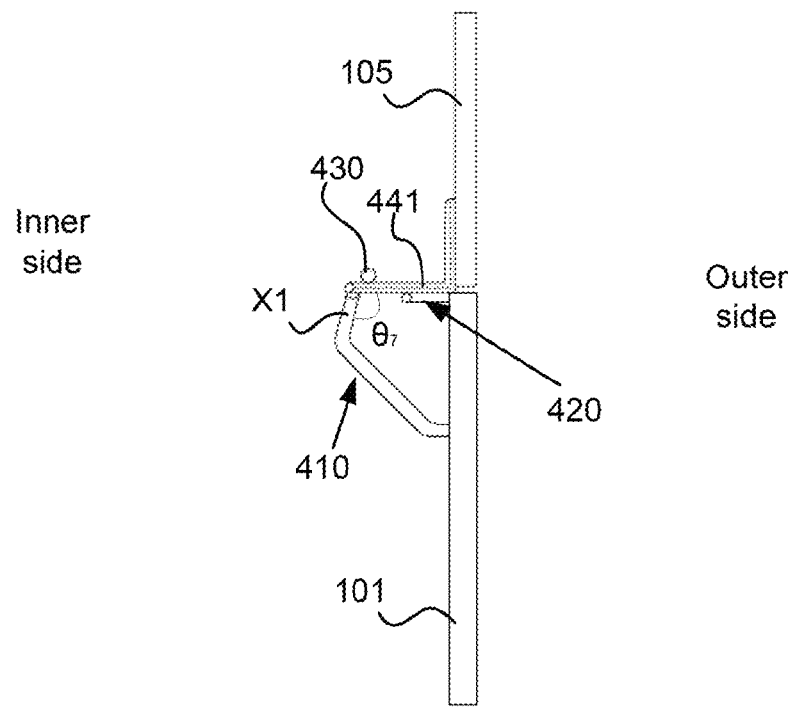

FIGS. 6A-6B illustrate the linkage assembly in the aerodynamic position according to an exemplary embodiment of the present disclosure. Referring to FIG. 6B, in the aerodynamic position P2, the linkage assembly 400 (i.e., 400A and 400B in FIG. 7A) is maintained in a second state. The second state can be attained from the first state by controlling the actuator 430, for example, by rotating the first link 410 in clockwise direction. In the second state, the first portion X1 of the first link 410 is at an angle $\theta_7$ with the base plate 441 of the bracket 440 and the second link 420 is substantially horizontal. Furthermore, the second state causes the side step 101 to occupy a vertical position, where the side step 101 extends downwards and becomes vertically aligned with the rocker panel 105. In the second state, the angle $\theta_7$ is greater than 90° but less than 180°.

Figure 7A:
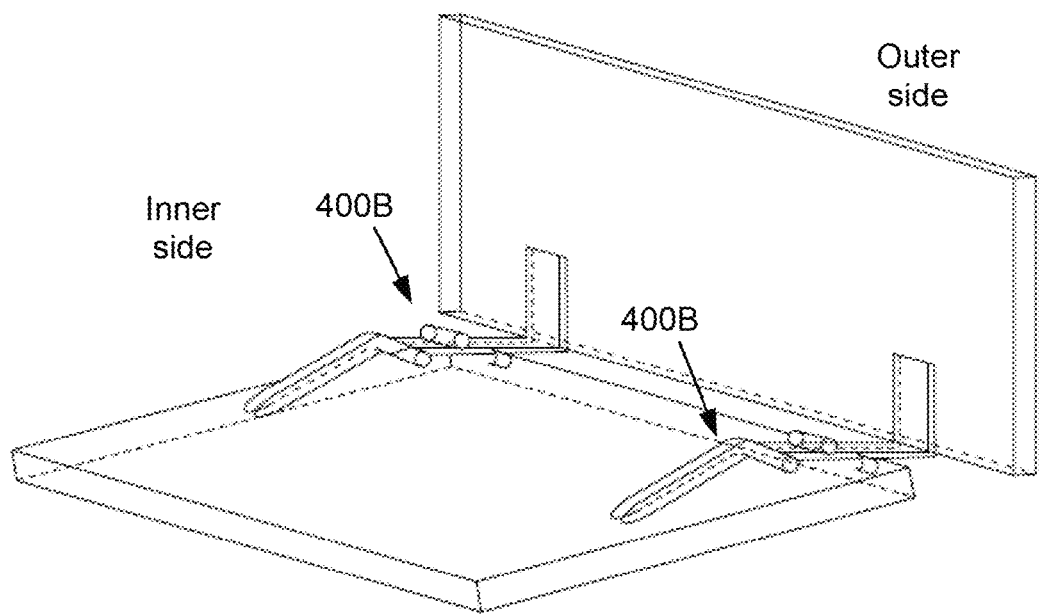
FIGS. 7A-7B illustrate the linkage assembly in the stowed position according to an exemplary embodiment of the present disclosure.
Figure 7B:
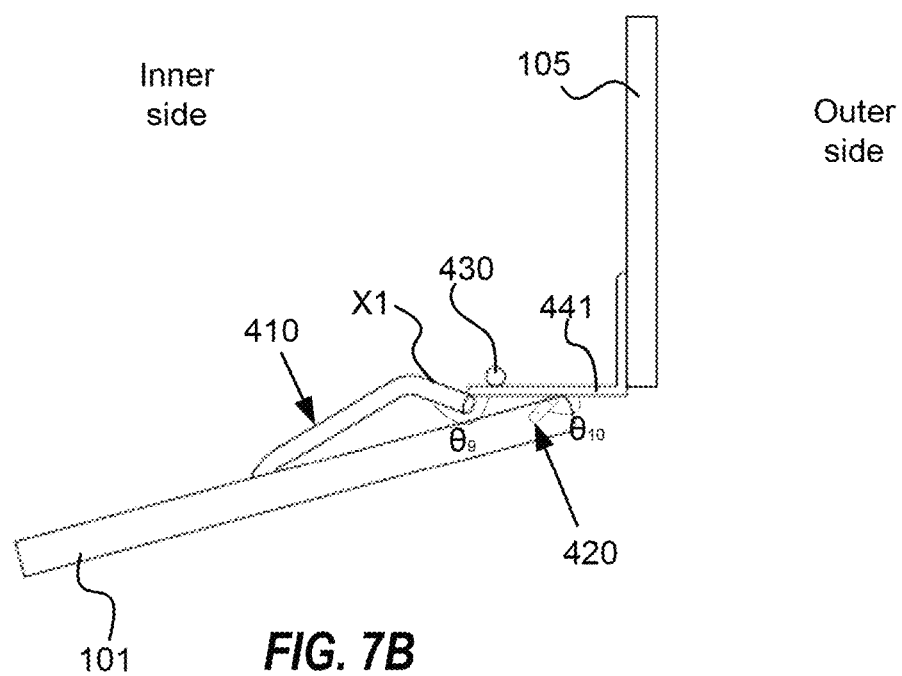

FIGS. 7A-7B illustrate the linkage assembly in the stowed position according to an exemplary embodiment of the present disclosure. Referring to FIG. 7B, in the stowed position P3, the linkage assembly 400 (i.e., 400A and 400B in FIG. 7A) is maintained in a third state. The third state of the linkage assembly 400 can be attained from the first state or the second state by controlling the actuator 430, for example, by rotating the first link 410 in clockwise direction. In the third state, the first portion X1 of the first link 410 is at an angle $\theta_9$ and the second link 420 is at an angle $\theta_{10}$ with the base plate 441 of the bracket 440. Furthermore, the third state causes the side step 101 to occupy a horizontal position on the inner side of the rocket panel 105. In the third state, the angles $\theta_9$ can be greater than 180° and the angle $\theta_{10}$ can be greater than 90° but less than 180° in the first state of the linkage assembly 400.

Furthermore, the linkage assembly 400 can be locked in a particular state—the first state, the second state, or the third state using a locking mechanism. The locking mechanism can also ensure that the side state 101 has additional support. Alternatively, the linkage assembly can be locked in a particular state by the actuator.

Alternatively or in addition, reinforcements can be added between the rocker panel and the side step 101 to extra support.

While certain embodiments have been described, these embodiments have been presented by way of example only, and are not intended to limit the scope of the present disclosures. Indeed, the novel apparatuses described herein can be embodied in a variety of other forms; furthermore, various omissions, substitutions and changes in apparatuses described herein can be made without departing from the spirit of the present disclosures. The accompanying claims and their equivalents are intended to cover such forms or modifications as would fall within the scope and spirit of the present disclosures.

What is claimed is:

1. A side step apparatus for a vehicle, comprising:
   a side step;
   a bracket having a base plate and a panel plate; and
   an actuation mechanism including a first link, a second link and an actuator connected between the base plate of the bracket and the side step to move the side step in at least one of a running board position, an aerodynamic position, and a stowed position based on a speed of the vehicle,
   wherein the first link includes a first portion having a first length, a second portion having a second length, and a third portion having a third length,
   wherein the first portion of the first link is pivotably connected to the base plate of the bracket allowing rotation of the first link relative to the base plate of the bracket,
   wherein the third portion of the first link is connected to the side step, and
   wherein the stowed position is achieved by rotating the first portion of the first link to a first angle with respect to the base plate of the bracket, such that the side step folded to an under side of the vehicle and is parallel to the ground.

2. The apparatus according to claim 1, wherein the first portion is inclined at an angle with respect to the second portion of the first link.

3. The apparatus according to claim 1, wherein the first portion is inclined at with respect to the second portion of the first link at an angle greater than 90°.

4. The apparatus according to claim 1, wherein the third portion is inclined at an angle with respect to the second portion of the first link.

5. The apparatus according to claim 1, wherein the running board position is achieved by maintaining the first portion of the first link at a second angle with respect to the base plate of the bracket, such that the side step projects on an outer side of the vehicle and is parallel to the ground.

6. The apparatus according to claim 1, wherein the aerodynamic position is achieved by rotating the first portion of the first link to a third angle with respect to the base plate of the bracket, such that the side step projects downwards and is perpendicular to the ground.

7. The apparatus according to claim 1, wherein the second link has a first end pivotably connected to the base plate of the bracket allowing rotation of the first link relative to the base plate and a second end connected to the side step.

\* \* \* \* \*